June 2, 1970 S. SEDLAK ET AL 3,515,625
COMPOSITE FLEXIBLE MATERIAL CONTAINING A HIGH
PROPORTION OF FILLER PARTICLES
Filed April 20, 1965
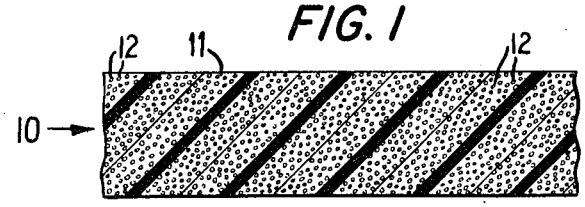
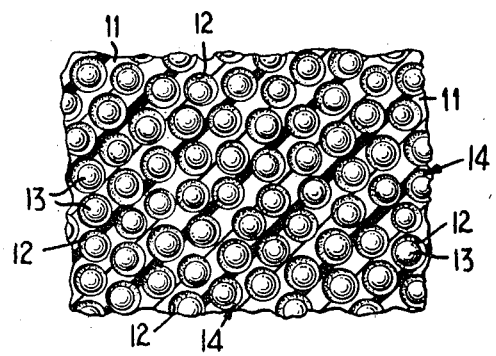
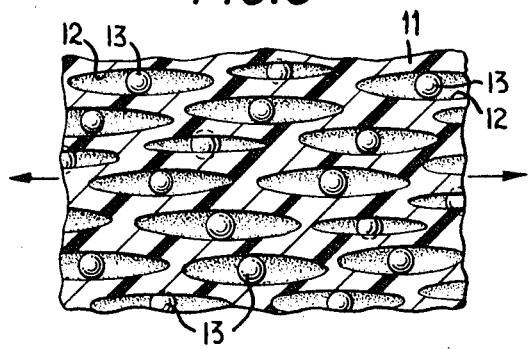
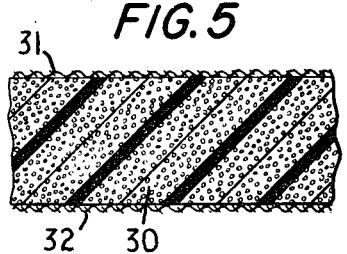
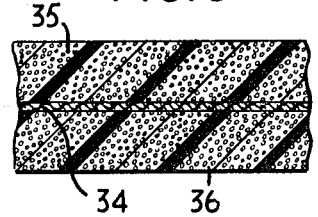
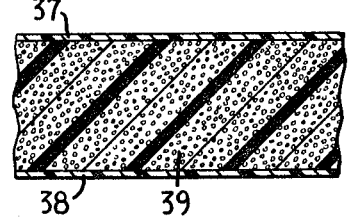
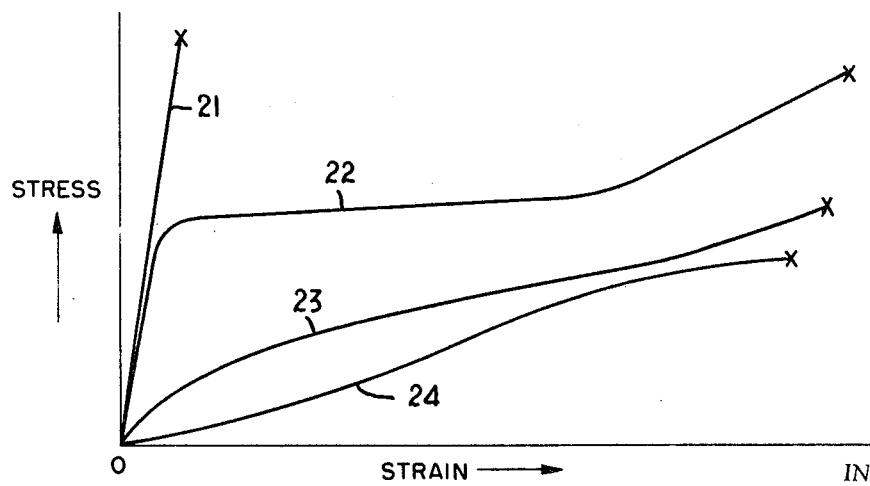
INVENTORS
STEVE SEDLAK &
ALBERT MAVROMATIS
BY
Brumbaugh, Free, Graves & Donohue
their ATTORNEYS

3,515,625
COMPOSITE FLEXIBLE MATERIAL CONTAINING A HIGH PROPORTION OF FILLER PARTICLES
Steve Sedlak, 201 E. 21st St., New York, N.Y. 10010, and Albert Mavromatis, Elmhurst, N.Y.; said Mavromatis assignor to said Sedlak
Filed Apr. 20, 1965, Ser. No. 449,593
Int. Cl. B32b 3/26; C04b 35/68
U.S. Cl. 161—160          13 Claims

ABSTRACT OF THE DISCLOSURE

In the particular embodiments of the invention described herein, elastomeric materials containing a high proportion of filler particles are prepared by adding particles which have a low bond-forming tendency to the uncured elastomeric material. After curing, the composite material is stretched to break any bonds which may have formed between the filler particles and the elastomeric matrix. To inhibit such bond formation, certain types of filler particles are coated with a low adherent material.

---

This invention relates to flexible materials containing rigid filler particles and, more particularly, to a new and improved composite flexible material which has greater flexibility for a given proportion of rigid filler material than has been possible heretofore.

In general, fillers are added to plastic matrix materials to impart desired properties to the resulting composite material. For example, carbon black is often added as a reinforcing filler to improve the strength and toughness of rubber. Similarly, pigments are added to impart tone or color. Actinic screening filters are added to eliminate radiations which may be harmful to a matrix material such as ultraviolet radiation, and inert extender or diluent fillers are added to a matrix material to impart bulk and lower the cost of the finished article. Also, the specific gravity of a material may be altered by adding a filler having higher or lower specific gravity, and a radiation shielding ability may be imparted by adding a radiation absorbing filler such as lead or tungsten.

Ordinarily, however, when a filler material consisting of rigid particles is added to a flexible or elastomeric material, the flexibility of the composite material is substantially reduced and the higher the proportion of filler substances, the lower is the flexibility of the composite material. Highly loaded materials, therefore, tend to be harder and more rigid than the same matrix having little or no loading with rigid filler material. Moreover, if attempts are made to maintain flexibility and softness of a composite material as the loading is increased by altering the composition of the matrix material, the strength of the composite material is so reduced that the composite material tends to disintegrate when handled even with relatively low filler content. Consequently, it has not heretofore been possible to provide a high degree of loading in a flexible composite material while maintaining the original flexibility and softness of the material.

Accordingly, it is an object of the present invention to provide a new and improved composite flexible material which overcomes the above-mentioned disadvantages of the prior art.

Another object of the invention is to provide a new and improved composite flexible material which may be loaded with particles of a rigid filler up to the maximum value attainable while, at the same time, maintaining substantially intact certain desired physical properties of the matrix material such as flexibility and softness.

A further object of the invention is to provide a composite flexible material which is highly loaded with a radiation absorbing filler such as lead or tungsten particles and which is, at the same time, characterized by a high degree of softness and flexibility so as to be useful in radiation protective articles such as sheets, gloves, aprons, and the like.

An additional object of the invention is to provide a composite flexible material which is loaded with particles of a high density rigid filler material, such as uranium, tungsten, or lead, for example, for use as a barrier against sound transmission and for damping out vibrations.

Still another object of the invention is to provide a composite flexible material which is loaded with rigid filler particles of any selected intermediate density to provide a flexible material having a desired density.

Yet another object of the invention is to provide a composite flexible material which is highly loaded with a low density filler material to produce a buoyant flexible material.

Another object of the invention is to provide a composite flexible material which is highly loaded with a magnetic filler material to provide a flexible magnetic material.

An additional object of the invention is to provide a composite flexible material having internal cavities of any desired size and uniformity to provide desired texture characteristics.

A further object of the invention is to provide a new and improved method of making composite flexible materials of the above character.

These and other objects of the invention are attained by providing a composite material consisting of an elastomeric matrix having a plurality of internal cavities so as to provide maximum flexibility of the matrix and a corresponding plurality of rigid filler particles contained within the cavities in substantially non-adherent enclosed relation. In order to assure that the composite material is loaded to the maximum extent possible without reducing its flexibility or softness, or weakening its basic structure, substantially all of the internal cavities in the matrix contain particles of rigid filler material.

Furthermore, to assure the virtually complete absence of cavities in the matrix in which no filler particles are enclosed, the process of making the composite material preferably includes the step of eliminating trapped gas as by stirring the mixture used to produce the composite material under a vacuum. Also, to prevent permanent adherence between the enclosed filler particles and the adjacent matrix surface, the particles of filler material have a surface which forms a bond with the matrix of lower strength than the strength of the matrix material itself and, in certain instances, this may be accomplished by providing the particles with a low adherence coating. In addition, the process preferably includes the step of deforming the material to break any bonds which may have been formed between the matrix material and the filler particles during the preparation of the composite material.

Further objects and advantages of the invention will be apparent from a reading of the following description in conjunction with the accompanying drawings, in which:

FIG. 1 is a view in transverse section through a typical composite flexible material prepared in accordance with the invention and made in the form of a sheet;

FIG. 2 is a fragmentary sectional view greatly enlarged illustrating the internal structure of the composite flexible material shown in FIG. 1;

FIG. 3 is a fragmentary sectional view similar to that of FIG. 2 illustrating the internal structure of the composite material when stretched;

FIG. 4 is a graphical representation illustrating certain properties of various forms of composite flexible materials according to the invention;

FIG. 5 is a sectional view similar to that of FIG. 1 illustrating a composite flexible material provided with strain limiting layers;

FIG. 6 is a sectional view of a further form of composite flexible material including a strain limiting layer; and FIG. 7 shows a different form of composite flexible material according to the invention provided with surface coatings.

In the typical composite flexible material according to the invention, as shown in FIGS. 1–3, a flexible sheet 10 comprises a continuous layer of elastomeric matrix material 11 which is formed with a large number of internal cavities 12. These cavities contribute to the flexibility and softness of the elastomeric sheet 11 in the same manner as do the cavities of foamed or blown flexible materials. As best seen in the greatly enlarged view of FIG. 2, however, each of the cavities in the matrix 11 of the present invention includes a filler particle 13 of rigid material which almost completely fills the volume of the cavity. Moreover, the surface of each filler particle 13 is in non-adherent relation to the adjacent surface of the enclosing cavity 12 as evidenced by the small gap 14 therebetween and, as a result, the presence of the particles 13 does not prevent deformation of the matrix material such as by stretching, as shown in FIG. 3.

As illustrated in FIG. 3, the matrix 11 has been stretched by pulling in opposite directions, as indicated by the arrows, so that the cavities 12 become elongated without interference by the enclosed particles 13. Thus, the flexibility and softness inherent in the cellular matrix material itself is essentially maintained in the composite material even though all of the cavities 12 which contribute to these properties are filled with the rigid particles 13 of filler material. In this connection, the size of the gap 14 between each particle and its enclosing cavity depends upon the extent of enlargement of the cavities 12 during curing and initial deformation of the matrix material. In general, however, the volume of each particle 13 is preferably about 85 to 100 percent of the cavity volume.

The filler material may be any substance which can be obtained in subdivided forms such as powders, crystals, beads, fine shot, spherules, etc., and the particles of filler material are dispersed substantially uniformly throughout the matrix 11 up to the maximum possible volume fraction of the composite material. Because the desirable property of the filler material is imparted to the composite material in proportion to the content of filler material, it is usually important to provide a composite material having the maximum possible content of filler material. For a hexagonal close-packed array of uniform diameter spheres, the theoretical maximum possible volume fraction of the spheres is 74.2 percent. In practice, however, the volume fraction of filler in a composite material will be lower because of random packing of the particles and random shape and size distribution thereof, as well as the gaps between the filler particles and the enclosed cavities. In the typical example illustrated in FIGS. 1–3, the volume fraction of filler material is about 50 percent. In general, the volume fraction of filler material achieved with the invention is greater than 40 percent.

Furthermore, the filler material is selected according to the particular property which it is desired to impart to the composite material. For example, tungsten or lead particles are used as a filler to impart nuclear and X-ray radiation shielding properties. Uranium, tungsten, or lead particles are high density fillers used in composite flexible materials designed to damp out vibration and to absorb sound. For flexible composite materials having a selected intermediate density, the filler material may be aluminum, glass, stainless steel, iron, copper, or plastic, or other materials selected to provide the desired density. Iron, magnetizable cobalt, or nickel particles, or alloys of them, are used for composite flexible materials having magnetic properties. Hollow spherules of glass or rigid plastic, or particles of foamed rigid plastic material, are used to produce a low-density composite flexible material.

The size of the filler particles used is not critical except that particles should be considerably smaller than, such as no more than one-half of, the minimum dimension of articles which will be made from the composite flexible material. Also, as described below, the elimination of adhesion between the particles and the surface of the cavities in the matrix material may be facilitated by increasing the particle sizes. For sheets of composite flexible material having a thickness of the order of 0.1 to 10 millimeters, particle sizes in the range from 2 to 1,000 microns have been found to be especially satisfactory but larger or smaller particles may be used. Although smooth spherical particles, as illustrated in FIGS. 2 and 3, provide maximum packing, the particles used in the composite material of the invention may have any shape and surface characteristics and still provide the advantages so long as the non-adherent relation is provided. Also, the texture of the composite flexible material depends to a certain extent upon the size and uniformity of the filler particles and, consequently, the texture may be controlled by appropriate selection of filler particles.

In order to assure a non-adherent relation between the filler particles and the surfaces of the enclosing cavities in the matrix material, certain types of particles may be provided with a coating which produces a non-adherent surface or one which has an adherent bond which is lower than the strength of the matrix material. For some metallic powders such as copper, a thin oxide coat produced by preheating the copper particles in air is sufficient to reduce bond strength so as to permit the non-adherent relation. In other instances, the particles may be coated with a highly plasticized layer of the matrix material itself or of another elastomeric material having a low bond strength. Furthermore, the bond strength between the matrix material and the particles may be reduced by using particles of increased dimensions so that the total filler particle surface area in contact with the matrix per unit volume of the composite material is reduced. On the other hand, some filler materials such as glass are, in themselves, insensitive to bonding and require no treatment to assure a non-adherent relation to the matrix material. Finally, for certain matrix materials such as natural rubber latex, a surface of reduced bond strength may be provided by dispersing lubricants or waxes in the latex before curing.

The material of the elastomeric matrix 11 may be any substance exhibiting resilient or elastic properties and is selected according to various factors such as the intended use and expected service conditions of the composite flexible material and the type of processing required. For example, natural rubber, synthetic rubbers of all kinds including silicones and urethanes, plastic elastomers such as plasticized polyvinyl chloride and the like, may be used. Typical commercially available elastomeric materials are the Union Carbide Chemical Corporation polyvinyl chloride dispersion resin identified as QYKV and the Goodrich Chemical Company polyvinyl chloride dispersion resin known as Geon Type 121. Dioctyl phthalate is a preferred plasticizer, although other plasticizers may be used.

In the representative embodiments of the invention described herein, the composite flexible material is prepared by mixing one part of the vinyl resin referred to above with about two parts of plasticizer to produce a plastisol. After the plastisol has been prepared, approximately 40 to 65 parts by volume of finely divided filler material is added until a substantially thickened consistency is obtained. Certain elastomeric compounds such as rubber latex, vinyl resin dispersions, liquid urethanes and the like, are relatively fluid at room temperature but other elastomers may have a very high viscosity or be relatively solid at room temperature. In such cases, mixing may be accomplished at elevated temperatures or by mechanical working, or both. Banburry mixers, roll mixers, extruders and the like, may be used for mixing. Furthermore, where required by the intended service conditions of the composite material, other additives such as pigments, vulcanizing agents, accelerators, anti-oxidants, plasticizers, stabilizers, lubricants and the like, may be added prior to or during the mixing process. If desired, the ratio of vinyl resin to plasticizer mentioned above may be varied between 1 to 1 and 1 to 4, depending upon the desired physical characteristics of the matrix material.

In order to eliminate trapped air or gas from the mixture which might produce cavities having no filler particles, the mixture is preferably stirred at about 1,000 to 5,000 r.p.m. under a partial vacuum such as 700 millimeters pressure for several minutes. Thereafter, the mixture is placed in a mold of the desired shape and heated to the extent necessary to cure the elastomeric matrix. In the case of sheet materials, the filled plastisol may be spread on a plate to a thickness of 0.1 to 10 millimeters, for example. Alternatively, especially where the mixture is not adequately fluid at room temperature, calenders or extruders may be used. The composite material of the invention may, of course, be produced in forms other than thin sheets and, in some cases, extruders may be employed to form continuous strips of constant cross-sectional shape while in others, where complex shapes are desired, hot or cold dipping or cavity, slush, rotational or injection molding may be employed.

Curing may take place either at room or at elevated temperatures, depending upon the elastomer used. Fluid urethane compounds cure at room temperature while rubbers and vinyl resins require elevated temperatures. When vinyl sheet material is made, it may be heated at about 150 to 200 degrees C. for about five to ten minutes. In many instances, the strength of any bond formed between the particle surface and the adjacent suface of the matrix increases within increasing curing time and curing times substantially in excess of about ten minutes have, in certain cases, been found to produce bonds which cannot be broken by subsequent deforming steps so that the resulting composite material is rigid rather than flexible.

After the composite material has been cured, it is removed from the die or curing apparatus and usually there will be moderately weak bonds between the particle surfaces and the adjacent cavity surfaces of the matrix material so that the composite material will be initially relatively hard and inflexible. Because precautions have been taken to assure that these bonds are weaker than the matrix material, however, they may be broken to provide the desired substantially non-adherent relation between the particles and the matrix by working the composite material such as by stretching or otherwise deforming it.

FIG. 4 is a graphical representation illustrating the relation between stress and strain for various types of composite materials during a stretching operation and, in this illustration, the slope of each curve at any point indicates the elasticity modulus of the material at the corresponding strain condition and the termination of each curve indicates the ultimate elongation of the material. The steep line at the left side of FIG. 4, identified with the numeral 21, represents the performance of a composite material when the interfacial bonds between the matrix and the filler particles are greater than the strength of the matrix itself. As shown by the steepness of this line, the elasticity modulus of the material is very high (i.e., the material is relatively hard, brittle, and inflexible) and the termination of the curve close to the stress axis indicates a very small ultimate elongation.

For a material having a moderate bond between the particles and the matrix, lower than the strength of the matrix material itself, the line identified with the numeral 22 in FIG. 4 represents the stress-strain relationship during the initial stretching of the sample. As indicated by the first portion of the curve which follows the line 21, the adherence of the particles to the matrix results in reduced flexibility and, therefore, a high elasticity modulus. When the stress reaches a level sufficient to break the bonds between the particles and the matrix, however, so as to produce the desired nonadherent relation, the material is stretched more easily and becomes much more flexible, as indicated by the nearly flat plateau section of the curve. After all of the bonds have been broken, the curve rises at a relatively low slope until the material ruptures. Subsequent stretching, after the initial one, yields a curve similar to that following the line 24 in FIG. 4. The low value of this slope, moreover, shows that the material is soft, nonbrittle, and highly flexible, and the termination point illustrates a high ultimate elongation.

The stress-strain relation for the initial stretching of a material having a low bond strength between the particles and the matrix is represented by the line 23. In this case, there is no well-defined plateau since the bonds begin breaking almost as soon as stretching commences. Furthermore, as in the previous case, the stress-strain relation for subsequent stretching lies approximately along the line 24.

In each instance, the stress-strain relation will tend to follow the line 24 for subsequent stretching of the material and the actual value of the elasticity modulus, i.e., the slope of the line 24 depends, of course, upon the particular matrix. In general, however, it will be approximately the same as that of a foamed or blown cellular elastomeric material, which will be considerably less than that of a solid piece of the same matrix material. In other words, the present invention accomplishes what had been previously considered impossible, i.e., the provision of a cellular elastomeric material having a rigid filler particle within each cell or cavity.

If desired, the initial deforming operation of strip or sheet materials may be accomplished automatically by passing the material around successive rollers arranged to bend it in opposite directions. Alternatively, the material may be stretched by passing it between successive pairs of rollers rotating at different speeds. For articles such as gloves, masks, and the like, a mold simliar in shape to the finished article may be expanded or distorted mechanically until all of the bonds are broken. After the particles have been detached from the surrounding matrix in the foregoing manner, the enclosing cavity surface 12 about each particle 13 becomes slightly larger than the cavity leaving the small gap 14 between the cavity and the particle. As a result, the volume fraction of the rigid filler particles in the composite material is reduced from the value obtained without gaps, as has been previously mentioned. It will be understood, of course, that the particles 13 need not be totally free of the matrix but may remain connected to the surface 12 of the surrounding cavity at one small region and still have the substantially non-adherent relation which provides the advantages of the invention because deformation of the matrix is not restricted in any way by such limited adherence.

In order to control the strength of any bonds which are formed between the particles and the matrix so that the desired relationships, as shown in lines 22, 23, and 24 of FIG. 4, are obtained, and that of the line 21 is avoided, the filler particles are provided with a surface having a reduced tendency to form strong bonds. As already mentioned, this is inherent in certain materials such as glass, so that no further preparation is required. For materials such as copper and other metals, a thin oxide surface coating produced by heating in air has been found to be sufficient. Also, coating of particles with a thin layer of another substance such as water soluble silicone, known commercially as Dow Corning Emulsion No. 36, has been found to reduce bond strength.

Another way of providing a low bond strength particle surface when using a plastisol as the matrix is to coat the particles with a thin layer of more highly plasticized plastisol. For example, the filler particles have been given a low bond strength surface by adding them to a mixture consisting of one gram of a plastisol consisting of 100 parts of QYKV to 325 parts of dioctyl phthalate and 50 grams of methyl ethyl ketone and the combination was poured onto a stainless steel plate and heated at 195 degrees C. for five minutes. After the methyl ethyl ketone had evaporated and the highly plasticized plastisol had been cured, the particles were removed from the plate and were separated from each other by light grinding with a mortar and pestle. Also, in a matrix made of rubber latex, adding a wax or lubricant to the latex reduces bond strength. Finally, as previously mentioned, the total bond strength per unit volume between large particles and the matrix material is less than that between small particles and the matrix, so that the bond strength may also be reduced by using larger particles.

In a representative composite flexible material made in sheet from according to the invention, approximately 45 parts by weight of a tungsten powder consisting of generally smooth-surfaced particles about 30 to 150 microns in diameter are added to three parts of the 2 to 1 vinyl plastisol described above, the tungsten powder designated No. 61, supplied by Metco, Inc., Westbury, N.Y., having been found to be especially satisfactory. A sheet approximately one and one-half millimeters thick is prepared and cured at 195 degrees C. for seven minutes. After the relatively weak bonds have been broken by stretching in the manner described above, the composite material has an elasticity modulus of about 20 p.s.i. and an ultimate elongation of more than 200 percent. Inasmuch as the volume fraction of tungsten particles in the composite material after initial strecthing is about 55 percent, the specific gravity of the composite flexible material is about 10. Because of its low elasticity modulus, the sheet is highly flexible and may be folded flat or bent to any desired configuration and it readily transmits pressures so that the sense of touch is not destroyed. As a result, an effective radiation shielding material is provided which is soft to the touch and highly flexible and also may be conveniently used for gloves, aprons, and other garments. In contrast conventional composite loaded radiation shielding materials three millimeters thick having corresponding shielding properties, i.e., equivalent to one millimeter thickness of solid lead, which are now used for sheets and aprons and the like, have an elasticity modulus of 1,500 to 2,000 p.s.i., do not transmit the sense of touch, and cannot be bent around a radius less than about three millimeters so that they cannot be used for gloves.

A similarly soft and flexible composite sheet material of somewhat lower specific gravity for use in radiation shielding or sound or vibration damping, for example, may be made by using lead particles of the same size range in place of the tungsten particles described above.

For flexible composite materials of any desired intermediate density, the filler is selected according to the desired density value. Typical filler materials useful for this purpose which are available in powdered, granular, or bead form are given in the following table along with their densities:

| Material: | Density |
|---|---|
| Synthetic plastics and hard rubber | 1.0–1.5 |
| Nylon | 1.1 |
| Beryllium | 1.8 |
| Soda-lime glass | 2.5 |
| Aluminum | 2.7 |
| High density glass | 4.5 |
| Titanium | 4.5 |
| Tin | 5.8 |
| Antimony | 6.7 |
| Manganese | 7.2 |
| Stainless steel | 7.7 |
| Iron | 7.9 |
| Copper | 8.9 |
| Nickel | 8.9 |

To provide a low density buoyant composite flexible material, hollow glass beads such as those known as Eccospheres R, supplied by Emerson & Cuming, Canton, Mass., are used as the rigid filler material and, in a particular example, a flexible composite sheet having a specific gravity of 0.8 is produced by substituting hollow glass beads having a size ranging from 30 to 300 microns for the tungsten particles described above. As previously mentioned, however, no preparation of the glass beads to assure a non-adherent relation to the matrix is required.

For certain applications in which excessive stress conditions might be encountered, such as to exceed the tensile strength of the composite material, a strain limiting component may be added to the flexible composite material to avoid tearing. When the composite flexible material is provided in sheet form, the strain limiting component is preferably an elastic stretch fabric of the type known commercially as "Powernet," using elastic fibers of the type generally designated "Spandex." FIGS. 5 and 6 illustrate typical sheet materials provided with such strain limiting fabrics. In FIG. 5, the sheet comprises a central layer 30 of composite flexible material of the type described above with respect to FIGS. 1–3 and two surface layers 31 and 32 of stretch fabric laminated to the opposite sides of the layer 30. The layers 31 and 32, which may either be added to the sheet structure before curing of the matrix material or may be bonded to the surfaces of the composite material after curing, are selected to limit the elongation of the sheet to a desired value such as 180 percent, which is less than the ultimate elongation of the central layer of composite material. If desired, the fabric layers may be stretchable in only one direction rather than in both directions.

According to the embodiment shown in FIG. 6, an elastic stretch fabric layer 34 is centrally disposed between two layers 35 and 36 of composite flexible material and this may be accomplished either by molding the composite material about the central layer 34 or by laminating two layers of composite material to opposite sides of the elastic stretch fabric layer.

For decorative purposes, or because of expected service conditions, the composite material of the invention may be provided with a smooth skin or surface coating and, if the material is in sheet form, it may be applied to both sides of the sheet, if desired. This is illustrated in FIG. 7 by the layers 37 and 38 on opposite sides of the layer 39 of composite flexible material. Both of the surface layers 37 and 38 may consist, for example, of an unloaded plastisol which is preferably plasticized to a greater degree than that of the matrix material, so as to have substantially the same elasticity modulus even though no cavities are included. For this purpose, a ratio of three parts of plasticizer to one part of vinyl resin has been found to be satisfactory.

If desired, pigments may be added to the surface layers or they may be embossed, the layers preferably being added to the central composite layer before curing. It will be understood, of course, that a composite flexible material according to the invention may be provided with both the strain limiting component of FIGS. 5 and 6 and the surface coating of FIG. 7. This may be done in any appropriate manner as, for example, by adding surface coatings to the embodiment of FIG. 6 or by substituting a surface coating for one of the layers 31 and 32 of FIG. 5.

We claim:

1. A composite flexible material containing a high proportion of rigid filler material comprising a continuous elastomeric matrix having a plurality of internal cavities, and a corresponding plurality of rigid filler particles contained within the internal cavities in substantially non-adherent enclosed relation to the cavity surfaces, substantially all of the cavities in the elastomeric matrix containing an enclosed filler particle, the volume of each cavity being slightly larger than its associated particle whereby a small gap is formed between the particle and the cavity wall.

2. A composite flexible material according to claim 1 wherein the size of the filler particles is within the range from 2 to 1,000 microns.

3. An article made of a composite flexible material according to claim 1 wherein the minimum dimension of the article is at least twice the size of the filler particles.

4. A composite flexible material according to claim 1 wherein the volume fraction of filler particles is at least about 40 percent.

5. A composite flexible material according to claim 1 wherein the filler particles are made of a radiation absorbing material.

6. A composite flexible material according to claim 1 wherein the filler particles are made of a material having a specific gravity greater than about ten grams per cubic centimeter.

7. A composite flexible material according to claim 1 wherein the filler particles have a density less than one gram per cubic centimeter.

8. A composite flexible material according to claim 1 wherein the filler particles are magnetic so as to provide a flexible magnetic material.

9. A composite flexible material containing a high proportion of rigid filler material comprising a continuous elastomeric matrix having a plurality of internal cavities distributed substantially uniformly throughout the matrix and a corresponding plurality of rigid filler particles having a size within the range from 2 to 1,000 microns contained within the internal cavities in substantially non-adherent enclosed relation to the cavity surfaces, the volume of each enclosed filler particle being slightly less than the volume of the cavity in which it is enclosed and whereby a small gap is formed between the particles and the cavity wall and the volume fraction of the filler particles being at least about 40 percent, substantially all of the cavities in the matrix containing an enclosed filler particle.

10. A composite flexible sheet containing a high proportion of rigid filler material comprising a continuous elastomeric matrix sheet having a plurality of internal cavities, and a corresponding plurality of rigid filled particles contained within the internal cavities in substantially non-adherent enclosed relation to the cavity surfaces, the maximum size of the filler particles being no greater than about one-half of the thickness of the matrix sheet, substantially all of the cavities in the matrix sheet containing an enclosed filler particle, the volume of each cavity being slightly larger than its associated particle whereby a small gap is formed between the particle and the cavity wall.

11. A composite flexible sheet according to claim 10 including a strain limiting layer of expandable fabric bonded to the matrix sheet.

12. A composite flexible sheet according to claim 11 wherein the strain limiting layer is centrally located within the sheet.

13. A composite flexible sheet according to claim 10 including a thin surface layer of solid material bonded to one surface of the matrix sheet.

References Cited

UNITED STATES PATENTS 3,230,184    1/1966    Alford.
3,316,139    4/1967    Alford et al.

ROBERT F. BURNETT, Primary Examiner

R. L. MAY, Assistant Examiner

U.S. Cl. X.R.

156—77, 229; 161—161, 162, 168, 77; 181—33; 252—478, 301.1